United States Patent
Haman et al.

(10) Patent No.: US 9,981,394 B2
(45) Date of Patent: May 29, 2018

(54) WORKSTATION

(71) Applicant: KUKA SYSTEMS GMBH, Augsburg (DE)

(72) Inventors: Robert Haman, Augsburg (DE); Richard Zunke, Augsburg (DE); Willi Klumpp, Ostfildern (DE); Michael Zürn, Sindelfingen (DE); Ralf Kühnemann, München (DE); Otmar Honsberg, Fürstenfeldbruck (DE); Matthias Reichenbach, Stuttgart (DE); Simon Klumpp, Neuhausen (DE); Andreas Domke, Stuttgart (DE); Konrad Wirth, Tiefenbronn (DE); Christian Eberdt, Stuttgart (DE); Kurt Strauss, Wildberg (DE); Alexander Gürtler, Heidese (DE); Reinhard Neureiter, München (DE); Thomas Rau, Diedorf (DE); Julian Stockschläder, Ulm (DE)

(73) Assignee: KUKA SYSTEMS GMBH, Augsburg (DE)

( * ) Notice: Subject to any disclaimer, the term of this patent is extended or adjusted under 35 U.S.C. 154(b) by 0 days. days.

(21) Appl. No.: 15/022,628

(22) PCT Filed: Sep. 17, 2014

(86) PCT No.: PCT/EP2014/069821
§ 371 (c)(1),
(2) Date: Mar. 17, 2016

(87) PCT Pub. No.: WO2015/040071
PCT Pub. Date: Mar. 26, 2015

(65) Prior Publication Data
US 2016/0229068 A1    Aug. 11, 2016

(30) Foreign Application Priority Data

Sep. 18, 2013    (DE) .................... 20 2013 104 264 U

(51) Int. Cl.
*B25J 19/06* (2006.01)
*B25J 9/16* (2006.01)
(Continued)

(52) U.S. Cl.
CPC ............. *B25J 19/06* (2013.01); *B25J 9/1676* (2013.01); *F16P 3/00* (2013.01); *F16P 3/148* (2013.01);
(Continued)

(58) Field of Classification Search
CPC .. B25J 19/06; B25J 9/1676; F16P 3/00; F16P 3/06; G05B 2219/40196;
(Continued)

(56) References Cited

U.S. PATENT DOCUMENTS

| | | | | |
|---|---|---|---|---|
| 6,778,092 B2 * | 8/2004 | Braune | .................. | F16P 3/144 |
| | | | | 250/221 |
| 2006/0049939 A1 * | 3/2006 | Haberer | .................. | F16P 3/144 |
| | | | | 340/541 |

(Continued)

FOREIGN PATENT DOCUMENTS

| | | |
|---|---|---|
| DE | 10 2004 043 515 A1 | 3/2006 |
| DE | 10 2005 003 827 A1 | 7/2006 |

(Continued)

*Primary Examiner* — Dalena Tran
(74) *Attorney, Agent, or Firm* — McGlew and Tuttle, P.C.

(57) ABSTRACT

A human-robot cooperation (HRC) workstation has a programmable industrial robot (4) and a manual working area (14) for a worker (5) in a region surrounding the industrial robot (4). In the HRC workstation (1), the working areas of the industrial robot (4) and the worker (5) overlap. Contact between the worker (5) and the industrial robot (4) is possible. The workstation (1) is divided into a plurality of (Continued)

different zones (17, 18, 19, 20) having differently high levels of risk of hazard from the industrial robot (4) for the worker (5). The industrial robot (4) is suitable for human-robot cooperation.

22 Claims, 2 Drawing Sheets

(51) Int. Cl.
*F16P 3/00* (2006.01)
*F16P 3/14* (2006.01)

(52) U.S. Cl.
CPC .............. *G05B 2219/40196* (2013.01); *G05B 2219/40198* (2013.01); *G05B 2219/40201* (2013.01); *G05B 2219/40478* (2013.01); *G05B 2219/45067* (2013.01)

(58) Field of Classification Search
CPC ........... G05B 2219/40198; G05B 2219/40201; G05B 2219/40478
USPC .................. 700/79, 245, 247, 255; 348/152; 318/568.11, 568.12, 568.18, 568.24
See application file for complete search history.

(56) References Cited

U.S. PATENT DOCUMENTS

| | | | |
|---|---|---|---|
| 2010/0191372 A1 | 7/2010 | Nihei et al. | |
| 2014/0067121 A1* | 3/2014 | Brooks | B25J 9/1676 700/255 |

FOREIGN PATENT DOCUMENTS

| | | |
|---|---|---|
| DE | 10 2006 046 759 A1 | 4/2008 |
| DE | 10 2007 006 708 A1 | 8/2008 |
| DE | 10 2007 014 023 A1 | 9/2008 |
| DE | 10 2007 028 390 A1 | 12/2008 |
| DE | 10 2007 037 404 A1 | 2/2009 |
| DE | 10 2007 028 758 B4 | 4/2009 |
| DE | 10 2007 059 481 A1 | 6/2009 |
| DE | 10 2007 063 099 A1 | 7/2009 |
| DE | 10 2010 007 025 A1 | 8/2011 |
| DE | 10 2011 109 908 A1 | 2/2012 |
| DE | 10 2005 027 522 B4 | 1/2013 |
| DE | 20 2012 101121 U1 | 7/2013 |
| WO | 2007/085330 A1 | 8/2007 |

* cited by examiner

WORKSTATION

CROSS REFERENCE TO RELATED APPLICATIONS

This application is a United States National Phase Application of International Application PCT/EP2014/069821 filed Sep. 17, 2014 and claims the benefit of priority under 35 U.S.C. § 119 of German Application 20 2013 104 264.1 filed Sep. 18, 2013, the entire contents of which are incorporated herein by reference.

FIELD OF THE INVENTION

The present invention pertains to a workstation with a programmable industrial robot, wherein the workstation has a manual working area for a worker in an area surrounding the industrial robot.

BACKGROUND OF THE INVENTION

Workstations with one or more robots are known from practice in various forms. As a rule, they are designed as fully automatic stations and they are equipped with protective partitions, which mechanically prevent the access of workers or switch off the industrial robot, for accident prevention for the workers.

Furthermore, there are efforts to allow humans to cooperate or collaborate with industrial robots, especially tactile robots. This is called human-robot cooperation (HRC). Tactile articulated arm industrial robots suitable for this are known from, e.g., DE 10 2007 063 099 A1, DE 10 2007 014 023 A1 and DE 10 2007 028 758 B4.

On the other hand, a safety monitoring at an industrial robot by means of desired values is known from DE 10 2007 059 481 A1. DE 10 2005 027 522 B4 discloses an industrial robot with a moving monitored area around the tool or the dangerous area by means of a capacitive sensor system. A risk assessment according to DIN EN ISO 12100 is to be performed for designing workstations.

SUMMARY OF THE INVENTION

An object of the present invention is to provide an improved workstation and an improved possibility of designing a workstation.

The workstation is configured for human-robot cooperation (HRC), and the work spaces of the industrial robot and the worker overlap and a physical contact is possible between the industrial robot and the worker. The workstation is divided into a plurality of different zones with different degrees of danger originating from the industrial robot for the worker. The industrial robot is configured as a robot suitable for HRC.

The workstation, plant and optical display being claimed have the advantage that the workstation is divided in reality and in the optical display into a plurality of different danger zones and it permits a correspondingly clear and safe design of the station as well as actuation and programming of the industrial robot.

It is especially advantageous that the different zones are marked differently according to their degrees of danger and thus they can be distinguished clearly, unambiguously and quickly. Color markings are especially well suited for this. A color graduation, which signals the danger levels from green to red similarly to a traffic light, is favorable.

This has various advantages. On the one hand, rapid and clear visualization of the HRC and the plant is achieved. Furthermore, the use of a dynamic or static catalog of forces during design is simplified. It is especially advantageous for this if a division is performed into an HRC zone with pain-free contacts between the human and the robot and a process zone with contacts that are free from injury but are not pain-free.

Due to the division into zones and the separation of the zones, simple and unambiguous implantations of velocity limits are possible for industrial robots in the HRC operation in the zones. Further advantages are simplified risk assessment and risk presentations.

The optical display, which may be, e.g., in the printed form or a screen display, facilitates the roll-out of the human-robot cooperation in a workstation and in a plant. The planner is given an aid for presenting the different forms of design of the HRC (e.g., for supplier requests, approval of equipment, etc.). The range of HRC applications is broad and covers, e.g., installations without safety fence, the work of a human next to or with the robot, the guiding of a robot by the human, etc. The optical display offers clarity and a visualizing tool for this in order to make it possible to assess the roll-out potential of the HRC in a workstation and in an entire plant.

Because of the novelty of HRC workstations and the limited amount of experience, the present invention offers new employees of a company the possibility of correctly assessing and utilizing a HRC workstation or plant. It is clearly indicated to such an employee in the area of planning, but also to a worker at the workstation on site at what locations he may reach into the workstation because it is possible to contact the robot without pain and where he must not reach because a contact is possible there with pain or even also with injuries. Due to the division into the zones according to the present invention and the marking of said zones, the effort needed for securing with mechanical protective partitions and with the obstacles associated therewith can be reduced as well.

Contrary to the risk assessment according to DIN EN ISO 12100, in which machine boundaries are simply determined, the present invention offers a better division for the risk assessment within the boundaries of the machine, and, in particular, different assignments of the HRC functionality are possible.

It is particularly advantageous for the division into zones according to a danger potential if the industrial robot itself is suitable for HRC and if it is designed especially as a tactile robot. As an alternative, the HRC suitability may also be established in another manner, e.g., by integrated or external optical or other contactless monitoring systems, a sensor system, e.g. with capacity sensors or the like, which is attached externally to the industrial robot or to the tool.

The HRC-suitable industrial robot, especially a tactile industrial robot, may show a behavior corresponding to the danger zones and the reachability by and the risk of collision for a human. This may pertain, in particular, to the response threshold, velocity and acceleration. Its range of motion may also be limited. Special mechanical protective measures and protective measures that possibly interfere with the process may be dispensable or at least reduced as a result.

An especially sensitive behavior of the robot may lead to limitations of the performance of the industrial robot in the process. It is possible to achieve a balance and an optimum between personal safety and performance capacity in the process by the division into zones and a zone-specific behavior of the robot.

A tactile robot has the advantage that, contrary to the state of the art mentioned in the introduction, no additional tool is necessary for monitoring the assigned HRC functionalities. Further, it is possible in case of a tactile robot with integrated sensor system to do away with and/or at least reduce the use of external monitoring systems. A tactile robot with integrated sensor system no longer has the predefined dependence from DE 10 2005 027 522 B4 on the particular application or the process and on the specification of a specific solution for generating a safety area. A safety area also no longer has to be entered as an input for safety monitoring in the HRC zones thereof.

The present invention also pertains to a design of an HRC workstation or of an optical display, especially a layout, in the printed form or as a screen display for such a workstation with a programmable industrial robot, said workstation having a manual working area for a worker in the area surrounding the industrial robot.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention pertains to a workstation (1), to a plant (2) and to an optical display (3) of the workstation (1) as well as to the design thereof.

Figure 1:
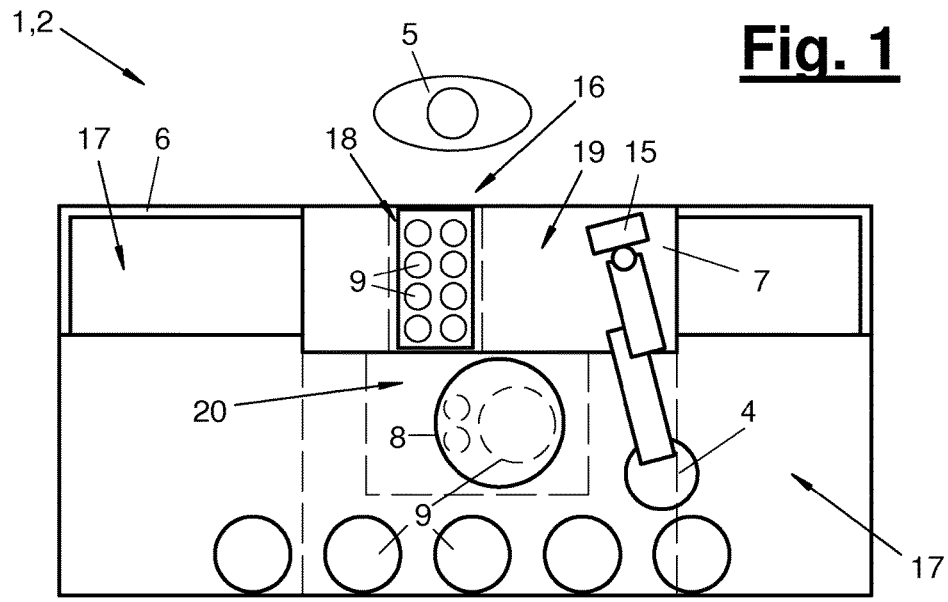
FIG. 1 is a workstation with an industrial robot, with a worker and with different danger zones with different zone markings.
Figure 2:
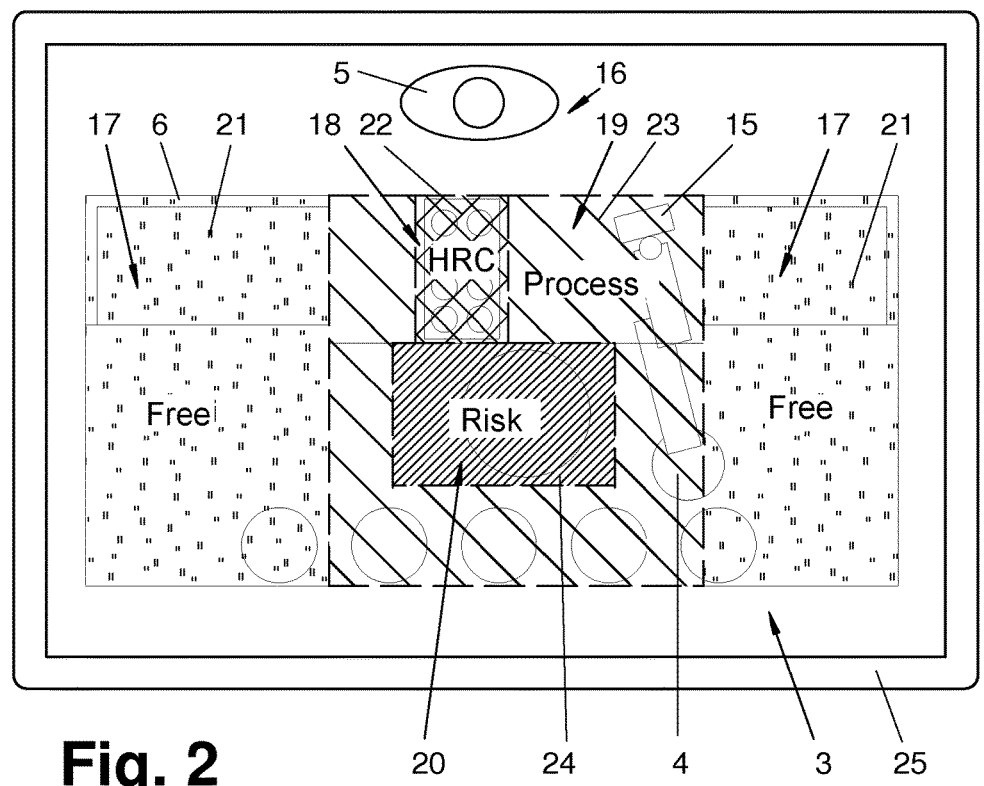
FIG. 2 is an optical display of the workstation from FIG. 1.

FIG. 1 shows a workstation (1), which may be designed as a singular station or as a component of a plant (2), especially of a manufacturing plant. Within a plant (2), a workstation (1) may also be present as a plurality of workstations, and identical or different processes are carried out here. FIG. 2 shows an optical display (3) of this workstation (1).

One or more processes of any desired type may be carried out within a workstation (1). In the exemplary embodiment being shown, the process is an assembly process, wherein one or more components (9), especially small parts, are mounted on a workpiece (8), or a workpiece (8) is also formed from such components. Other possible types of processes pertain to joining processes, shaping processes, application processes, testing processes or the like.

The workstation (1) has a programmable industrial robot (4) and a manual working area (16) for a worker (5), which is accommodated in the area surrounding the industrial robot (4). The work spaces of the industrial robot (4) and of the worker (5) may overlap. A plurality of industrial robots (4) and/or a plurality of manual working areas (16) may also be present within a workstation (1).

The industrial robot (4) carries a tool (15) for the particular process, which is designed, e.g., as a gripping tool. The tool (15) may be mounted on the industrial robot (4) permanently or in an automatically changeable manner by means of a change coupling. The workstation (1) may have, in addition, one or more auxiliary devices (not shown), which can be operated manually, or are automatic and possibly driven.

The industrial robot (4) is designed as a robot suitable for human-robot cooperation (HRC). It is preferably a tactile multi-axis industrial robot (4) with preferably integrated sensor system (14), which possesses sensory properties and can itself detect a physical contact with the human body or other obstacles and respond hereto. It may, e.g., stop or possibly even move away from the contact point, especially move back. The tactile industrial robot (4) detects a physical contact as an external load, which appears at an unexpected position of the robot. There may be different load and response thresholds for the response to a physical contact.

The industrial robot (4) may be designed, e.g., according to DE 10 2007 063 099 A1, DE 10 2007 014 023 A1 and/or DE 10 2007 028 758 B4. A preferred embodiment will be explained below.

The workstation (1) is divided into a plurality of different zones (17, 18, 19, 20), there being different degrees of danger originating from the industrial robot (4) for the worker (5) in the zones (17, 18, 19, 20). The different zones (17, 18, 19, 20) have different markings (21, 22, 23, 24) for their distinction. The markings (21, 22, 23, 24) can be detected by a worker (5) or a planner in any desired manner, preferably optically or visually. They are designed, e.g., as color markings.

The markings (21, 22, 23, 24) for the particular zone (17, 18, 19, 20) signal the degree of danger present in the zone for the worker (5). The markings (21, 22, 23, 24) signal the extension in space of the corresponding zone (17, 18, 19, 20). The boundaries of the zones (17, 18, 19, 20), which are preferably separated from one another, are thus also signaled and especially visualized.

A marking (21, 22, 23, 24), especially a color marking, may have different designs, e.g., it may be designed as a larger, contiguous marking surface, especially color surface, which possibly has the width of the zone. A marking (21, 22, 23, 24) may also be designed as a stripe-shaped or linear marking, e.g., as an edge marking at the edge of the zone, especially as a colored edge border, as a line of marking dots or the like. A marking (21, 22, 23, 24) may appear in an optical display (3) as a colored background area or as a translucent colored edge, the design structures of the workstation (1) remaining recognizable.

FIG. 2 shows an optical display (3) or a layout of the aforementioned workstation (1). The display (3) is designed, e.g., as a screen display on a monitor (25). As an alternative, an optical display (3) may also be a printout of the layout of the station or plant on paper or film. In addition, a software tool for planning or designing workstations (1) is also a part of the present invention. The optical display (3) or a layout formed herefrom may be present as an optical and visually detectable output format of the software tool. The markings (21, 22, 23, 24) are symbolized in FIG. 2 by different surface patterns or shadings.

The working device (1) is divided into four danger zones (17, 18, 19, 20) in the exemplary embodiment being shown. The number of zones and danger zones formed may also be lower or higher and may equal, e.g., three or five. Further, it is possible that a plurality of zones with an identical degree of danger are present in the workstation (1).

The industrial robot (4), especially a tactile robot, may display different behaviors, especially in terms of load and response thresholds, velocity and acceleration, within the danger zones (17, 18, 19, 20). This depends on the current position of the robot reference, especially of the tool center point (TCP), in relation to a zone (17, 18, 19, 20). The industrial robot (4) is actuated for this correspondingly by the robot control (not shown).

A zone (17) is designed, e.g., as a free zone, which is safe for a worker (5). A free zone (17) cannot be reached by the industrial robot (4) and/or has a securing means (6), especially a protective partition. A free zone (17) is present in duplicate in FIGS. 1 and 2. A free zone (17) is marked, e.g., by a green color marking (21). If a free zone (17) overlaps the work space of the industrial robot (4), the behavior of the robot is not subject here to any restrictions that are due to personal safety and would reduce the performance.

Another zone (18) is designed as an HRC zone, in which the work spaces of the worker (5) and industrial robot (4) overlap as intended. A physical contact between worker (5) and industrial robot (4) is possible within the HRC zone without injuries to the worker (5). If a physical contact takes place, this causes no or only slight pain. An HRC zone (18) is marked, e.g., by a yellow color marking (22).

The velocities and accelerations as well as the load and response thresholds of the industrial robot (4) are especially low in the HRC zone (18) and they permit the aforementioned behavior of the robot in case of a contact. The work space of the industrial robot (4) may, in addition, be restricted by programming or mechanically.

Another zone (19) is designed as a process zone, which is located in the work space of the industrial robot (4). The process zone (19) can be reached by a worker (5) in case of behavior that is not as intended. A physical contact between the worker (5) and the industrial robot (4) is possible without injuries, and more intense pain may possibly have to be accepted. A process zone is marked, e.g., by an orange color marking (23).

The velocities and accelerations as well as the load and response thresholds of the tactile industrial robot (4) may be higher in the process zone (19) than in the HRC zone (18). This increases, on the other hand, the performance capacity of the robot.

Another zone (20) is designed as a risk zone, which is located in the work space of the industrial robot and can be reached by a worker (5) in case of a behavior that is not as intended. The industrial robot (4) carries out the automatic process, e.g., the assembly process, here and fits the workpiece (8) with the components (9).

A physical contact between the worker (5) and the industrial robot (4) is possible in the risk zone (20), and there is a threat of injuries. An additional securing means (6) may be necessary or provided for the worker (5). This may be designed, e.g., as a photoelectric cell or other similar detection means for detecting the entry of a body part into the risk zone (20). A risk zone (20) is marked, e.g., by a red color marking (24).

The velocities and accelerations as well as the load and response thresholds of the tactile industrial robot (4) may be even higher in the risk zone (20) than in the HRC and process zones (18, 19). The robot's performance capacity can be maximized.

From a design point of view, the workstation (1) has, e.g., a workbench (7) with the manual working area (16) and laterally adjoining protective partitions (6), e.g., fences, barriers or the like to form the free zone (17). The workstation (1) may have, in addition, e.g., a housing, a fence or the like, which separates the free zone (17) from the surrounding area. Instead of a mechanical protective partition, another form of securing (6), e.g., by photoelectric cells, contact mats on the floor or other similar detection means may be present as well.

The HRC zone (18) is formed on the workbench (7) at the edge and in the area of the manual working area (16). This may be a feed area, in which a worker (5) feeds one or more components (9) and provides it/them to the industrial robot (4). The worker (5) may possibly also perform manual assembly operations here.

On the side facing away from the worker (5), the HRC zone (18) is adjoined by the risk zone (20), in which the industrial robot (4) carries out the actual process, e.g., the automatic assembly of the component on the workpiece (8) or to form the workpiece (8).

The HRC zone (18) and the risk zone (20) may be surrounded on the side by the process zone (19). The industrial robot (4) may possibly be arranged in the process zone (19). In addition, automatic feeding of components (9) may take place in the process zone (19). The feeding device is not shown for clarity's sake.

Figure 3:
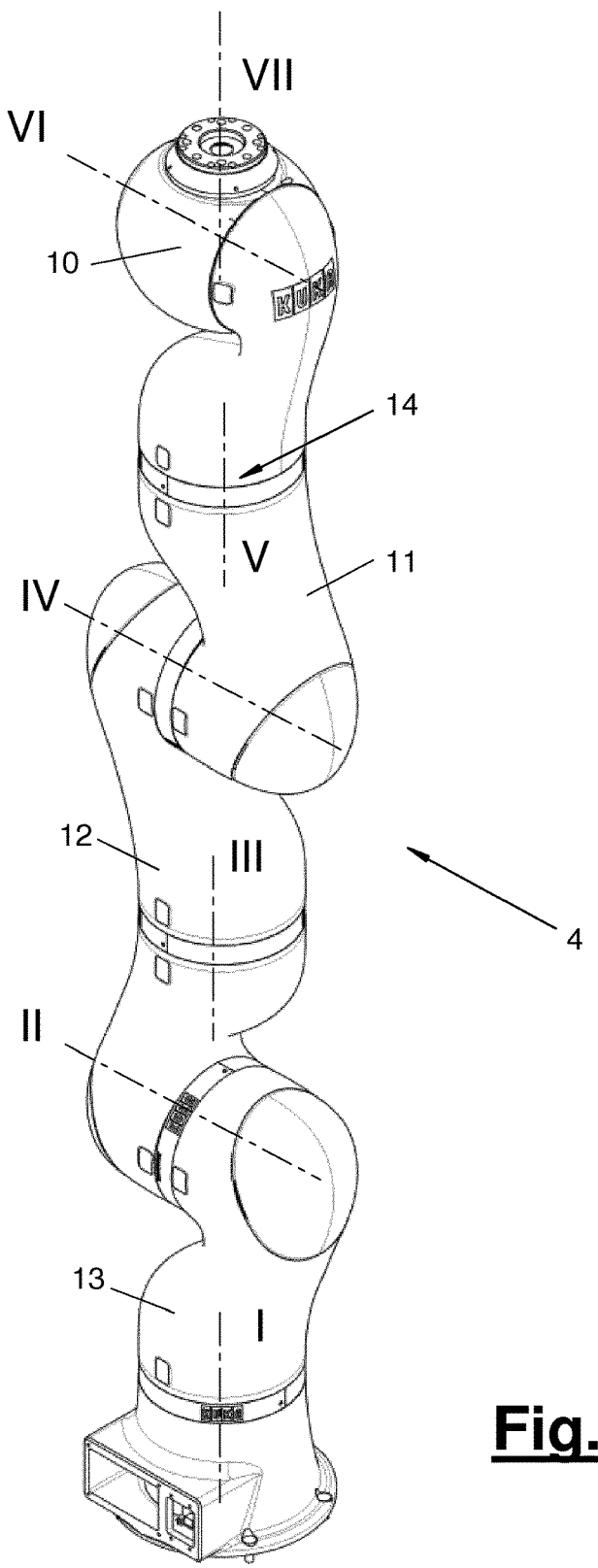
FIG. 3 is a tactile industrial robot in the stretched position.

FIG. 3 shows a preferred embodiment of the tactile industrial robot (4) schematically indicated in FIGS. 1 and 2 in the stretched position and without the tool (15).

The industrial robot (4) has a plurality of, preferably three or more, movable links (10, 11, 12, 13), which are connected to one another. The links (10, 11, 12, 13), of which there are, e.g., four, are preferably connected to one another in an articulated manner and via rotating robot axes I-VII. In the exemplary embodiment being shown, it has a basic link (13) connected to the base and an end link (10) as well as two intermediate links (11, 12). The intermediate links (11, 12) are multipart links and are designed as links rotatable in themselves by means of axes (III) and (V). As an alternative, the number of intermediate links (11, 12) may be lower or higher. In another variant, individual intermediate links or all intermediate links (11, 12) may be designed such that they are nonrotatable in themselves and lack an additional axis. The links (10, 11, 12, 13) may have a straight shape or, according to FIG. 3, an angulated shape. The industrial robot (4) may be arranged according to FIGS. 1 and 2 upright or, as an alternative, suspended.

In the exemplary embodiment being shown, the industrial robot (4) is designed as an articulated-arm or bent-arm robot and has seven driven axes or axes of motion I-VII. The axes I-VII are connected to a robot control and can be controlled and possibly regulated. The driven end link (10) of the industrial robot (4) is designed, e.g., as a robot hand and has a driven element rotatable about an axis of rotation, e.g., a driven flange, for mounting the tool (15) or a change coupling. The axis of rotation forms the last robot axis VII.

The robot axes I-VII have each an axle bearing, e.g., a journal bearing, e.g., a pivot bearing or a joint, and a controllable, possibly regulatable axis drive, e.g., rotary drive, which is associated and integrated here. In addition, the robot axes I-VII may have a controllable or switchable brake and the optionally redundant sensor system (14), which is indicated by an arrow only in FIG. 3. The sensor system (14) may be integrated and may have, e.g., one or more sensors on one or more robot axes I-VII. These sensors may have identical or different functions. They may be designed especially to detect loads acting from the outside, especially torques. Furthermore, they may detect rotary motions and possibly rotation positions. In another embodiment, such a sensor system connected to the robot control may be mounted externally on the industrial robot (4), e.g., on the driven element or on the tool (15).

The aforementioned force control or force regulation of the robot axes (I-VII) pertains to the action to the outside on the driven element of the end link (10) as well as to the forces of reaction acting there. A torque control or torque regulation takes place on the rotating axes or axis drives internally within the robot.

The industrial robot (4) may have one or more flexible axes (I-VII) or flexible axis drives with a flexibility regulation for the HRC suitability. The flexibility regulation may be a pure force regulation or a combination of a position regulation and a force regulation. Such a flexible axis avoids accidents with persons and crashes with objects in the work area by limiting forces and possibly stopping or a springy evasion in case of unforeseen collisions.

On the other hand, it can be advantageously utilized in different respects for the work process. On the one hand, the ability of the industrial robot (4) to evade in a spring-loaded manner can be used for manual teaching and programming In addition, the searching for and finding of the working position can be supported and facilitated by means of a load detection with the robot's sensor system on the axes (I-VII). Angle errors in the relative position of the links (10, 11, 12, 13) can also be detected and corrected as needed. One or more flexible axes are, in addition, advantageous for adjusting the tool (15) corresponding to the feed. The industrial robot (4) may, in addition, apply a defined pressing or tensile force as needed.

The industrial robot (4) shown may be designed as a lightweight robot and consist of lightweight materials, e.g., light metals and plastic. It has a small overall size. The tool (15), whose design and function are simplified, likewise has a low weight. The industrial robot (4) with its tool (15) has, as a result, on the whole, a low weight and can be transported and transferred from one site of use to another with little effort. The weight of the industrial robot (4) and tool (15) may be less than 50 kg, especially about 30 kg. Due to the possibility of manual teaching, it can be programmed, put into operation and adapted to different processes rapidly and in a simple manner.

The industrial robot (4) is programmable, and the robot control has a calculation unit, one or more memories for data or programs as well as input and output units. The tool (15) may be connected to the robot control or another common control and may be implemented, e.g., as a controlled axis in the robot control. The robot control can store process-relevant data, e.g., sensor data and log them for quality control and quality assurance.

Various modifications of the embodiments shown and described are possible. In particular, the features of the different exemplary embodiments may be combined and especially be replaced with one another as desired. The HRC suitability may be established in another manner, e.g., by an optical monitoring system, which detects the movements of the worker and possible danger situations and the industrial robot (4) is actuated correspondingly. The industrial robot (4) does not have to possess any sensory or tactile properties of its own in this case. However, it may have the aforementioned zone-specific velocity and acceleration behavior.

While specific embodiments of the invention have been shown and described in detail to illustrate the application of the principles of the invention, it will be understood that the invention may be embodied otherwise without departing from such principles.

The invention claimed is:

1. A workstation comprising:
a programmable tactile industrial robot with a work space in an area surrounding the industrial robot; and
a manual working area with a workspace for a worker in the area surrounding the industrial robot the workstation being configured for human-robot cooperation (HRC), wherein the work spaces of the industrial robot and of the worker overlap and a physical contact is possible between the industrial robot and the worker, wherein the workstation is divided into a plurality of different zones with different degrees of danger originating from the industrial robot for the worker, and wherein the industrial robot is configured as a robot suitable for HRC, the workstation having different markings on the different zones, wherein one of the markings for one of the zones signals a degree of danger of the one of the zones for the worker or signals an extension in space of the one of the zones or signals both the degree of danger of the one of the zones and an extension in space of the one of the zones, wherein the tactile industrial robot has a different behavior in terms of a load and response threshold within danger zones.

2. A workstation in accordance with claim 1, wherein the industrial robot has a plurality of links, which are connected to one another movably and rotatably, and one or more force-controlled or force-regulated robot axes as well as an associated sensor system detecting acting loads.

3. A workstation in accordance with claim 1, wherein the industrial robot has at least one flexible robot axis with a flexibility regulation, especially with a pure force regulation or a combination of position and force regulation.

4. A workstation in accordance with claim 1, wherein the workstation comprises an assembly station.

5. A workstation in accordance with claim 1, wherein the industrial robot carries a gripping tool.

6. A workstation in accordance with claim 1, wherein the zones comprise a free zone that is safe for a worker.

7. A workstation in accordance with claim 6, wherein the free zone cannot be reached by the industrial robot or the free zone has a securing means defining a protective partition.

8. A workstation in accordance with claim 6, wherein the free zone has a green color marking.

9. A workstation in accordance with claim 1, wherein the zones comprise a zone configured as an HRC zone, in which the work spaces of the worker and of the industrial robot overlap as intended, allows for a physical contact between the worker and the industrial robot to be possible without injuries and without pain or with only mild pain.

10. A workstation in accordance with claim 9, wherein the HRC zone has a yellow color marking.

11. A workstation in accordance with claim 1, wherein the zones comprise a zone configured as a process zone, which is located in the work space of the industrial robot and can be reached by a worker in case of a behavior that is not as intended, wherein a physical contact between the worker and the industrial robot is possible without injuries and major pain.

12. A workstation in accordance with claim 11, wherein the process zone has an orange color marking.

13. A workstation in accordance with claim 1, wherein the zones comprise a zone configured as a risk zone located in the work space of the industrial robot and can be reached by a worker in case of a behavior that is not as intended, wherein a physical contact between the worker and the industrial robot is possible with injuries and an additional securing is necessary or provided.

14. A workstation in accordance with claim 13, wherein the risk zone has a red color marking.

15. A workstation in accordance with claim 1, wherein the tactile industrial robot has a different behavior in terms of velocity and acceleration within the danger zones.

16. A workstation in accordance with claim 1, further comprising:
a monitoring unit, the monitoring unit displaying at least the different markings on the different zones associated with the workstation, wherein the tactile industrial robot is configured to contact the worker.

17. A plant comprising one or more workstations, each of the one or more workstations comprising:
a programmable tactile industrial robot with a work space in an area surrounding the industrial robot; and
a manual working area with a workspace for a worker in the area surrounding the industrial robot, the workstation being configured for human-robot cooperation (HRC), wherein the work spaces of the industrial robot and of the worker overlap and a physical contact is possible between the industrial robot and the worker, wherein the workstation is divided into a plurality of different zones with different degrees of danger originating from the industrial robot for the worker, and wherein the industrial robot is configured as a robot suitable for HRC, the workstation having different markings on the different zones, wherein one of the markings for one of the zones signals a degree of danger of the one of the zones for the worker or signals an extension in space of the one of the zones or signals both the degree of danger of the one of the zones and an extension in space of the one of the zones, wherein the tactile industrial robot has a different behavior in terms of a load and response threshold within danger zones.

18. A plant in accordance with claim 17, further comprising:
a monitoring unit, wherein the monitoring unit displays at least one workstation having different markings on the different zones associated with the at least one workstation, wherein the tactile industrial robot is configured to contact the worker.

19. A method for designing a workstation or an optical display, especially a layout, in a printed form or as a screen display for a workstation the method comprising the steps of:
providing the workstation with a programmable tactile industrial robot;
providing the workstation with a manual working area for a worker in the area surrounding the industrial robot;
configuring the workstation for human-robot cooperation (HRC);
providing the work spaces of the industrial robot and of the worker so as to overlap and such that a physical contact is possible between the industrial robot and the worker;
dividing the workstation into a plurality of different zones with different degrees of danger originating from the industrial robot for the worker;
providing different markings on the different zones, wherein one of the markings for one of the zones signals a degree of danger of the one of the zones for the worker or signals an extension in space of the one of the zones or signals both the degree of danger of the one of the zones and an extension in space of the one of the zones; and
configuring the industrial robot as a robot suitable for HRC, wherein the tactile industrial robot has a different behavior in terms of a load and response threshold within danger zones.

20. A method in accordance with claim 19, wherein the workstation or the optical display at the different zones are provided with different color markings.

21. A method in accordance with claim 20, wherein velocity limits are implemented for the industrial robot in the HRC operation in the zones by means of the division into zones and the separation of the zones.

22. A method in accordance with claim 19, further comprising:
providing a display;
displaying the markings on the different zones on the display, wherein the tactile industrial robot is configured to contact the worker.

* * * * *